Patented Aug. 30, 1932

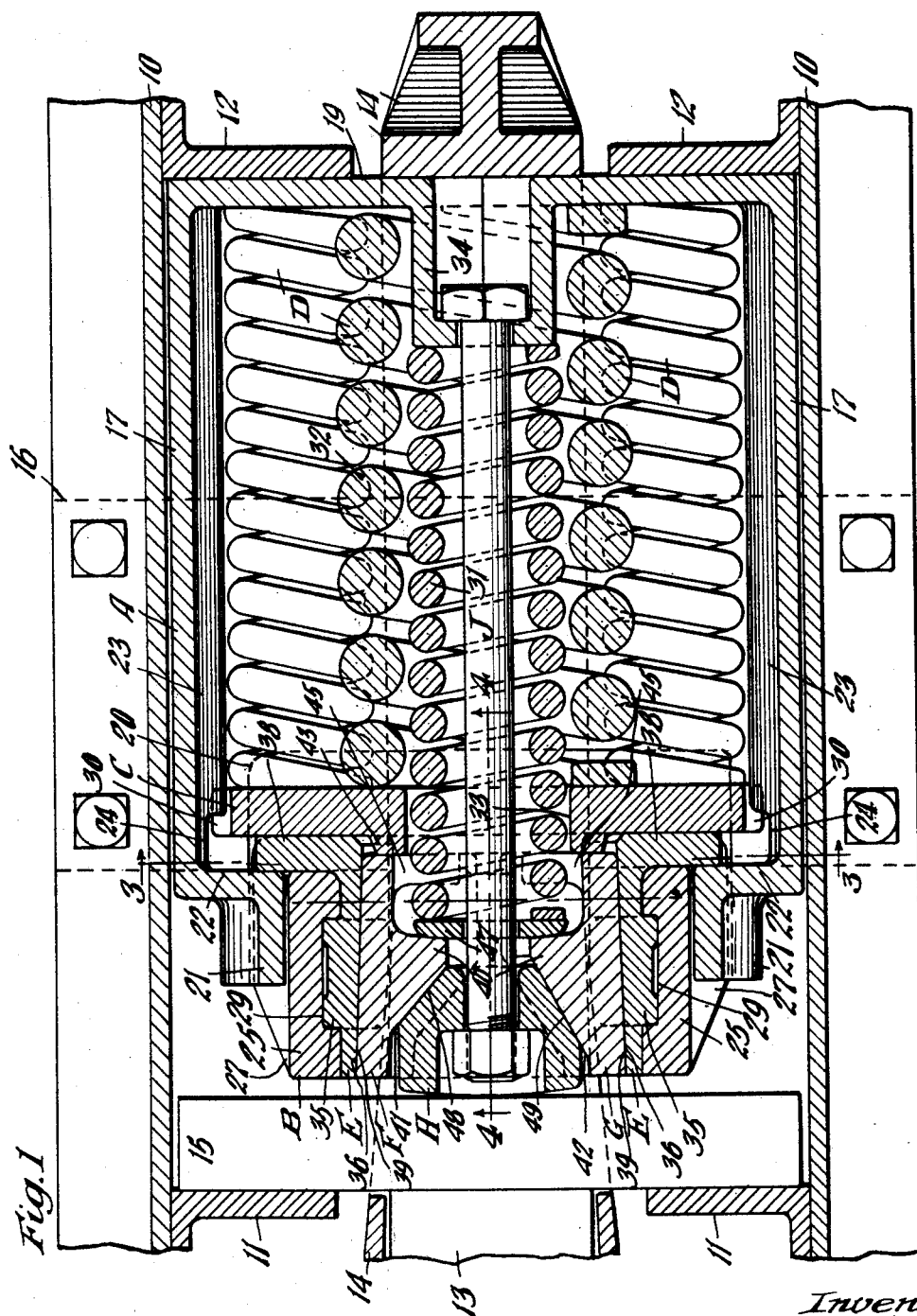

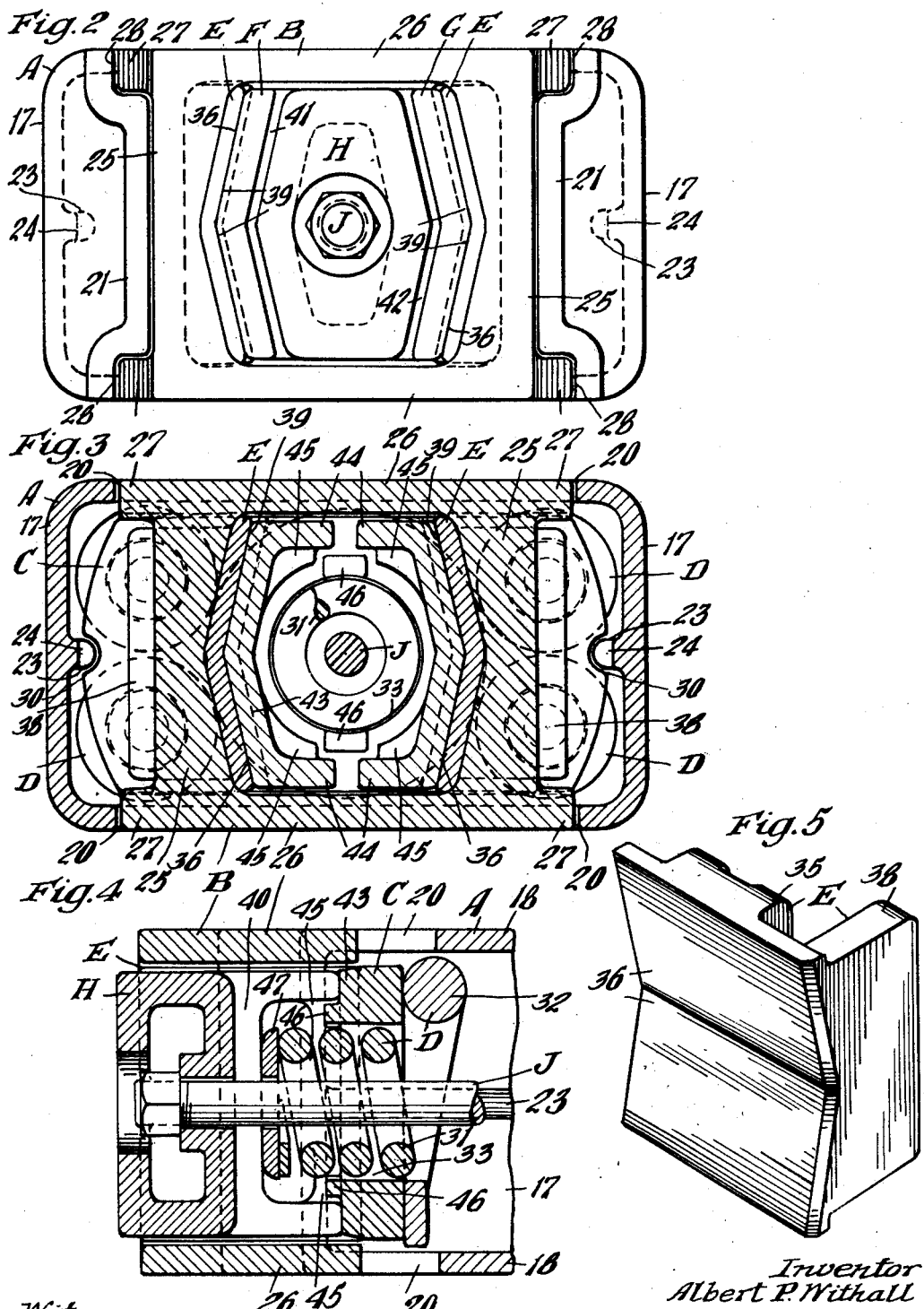

1,874,403

UNITED STATES PATENT OFFICE

ALBERT P. WITHALL, OF CHICAGO, ILLINOIS, ASSIGNOR TO W. H. MINER, INC., OF CHICAGO, ILLINOIS, A CORPORATION OF DELAWARE

FRICTION SHOCK ABSORBING MECHANISM

Application filed September 10, 1928. Serial No. 304,924.

This invention relates to improvements in friction shock absorbing mechanisms.

One object of the invention is to provide a friction shock absorbing mechanism especially adapted for railway draft riggings affording free spring action during the first part of the compression stroke, including a friction shell and spring cage which are relatively movable with respect to each other to a limited extent and have their movement resisted by spring means to provide for the free spring action, and friction wedge means cooperating with the shell and having its movement resisted by said spring means during the latter part of the compression stroke and providing high frictional resistance, wherein simple and efficient means is employed to anchor the friction shell to the cage to provide for a limited movement thereof comprising liners secured to the friction shell and having laterally projecting anchoring flanges thereon engaging limiting shoulders on the cage.

A more specific object of the invention is to provide a mechanism of the character indicated including a spring cage; a friction shell telescoped within the cage; interior liners anchored to the shell and having laterally outwardly projecting flanges at the rear ends thereof exterior to the shell and extending outwardly beyond the same and having shouldered engagement with the cage to limit outward movement of the shell with respect thereto; friction means cooperating with the liners including friction shoes and a wedge spreading member; and spring resistance means within the cage opposing the relative movement of the shell with respect thereto and also yieldingly resisting relative movement of the friction means and shell.

Other objects of the invention will more clearly appear from the description and claims hereinafter following.

In the drawings forming a part of this specification, Figure 1 is a horizontal, longitudinal sectional view of a portion of a railway draft rigging illustrating my improvements in connection therewith. Figure 2 is a front end elevational view of my improved shock absorbing mechanism, proper. Figure 3 is a transverse vertical sectional view corresponding substantially to the line 3—3 of Figure 1. Figure 4 is a vertical longitudinal sectional view of the front portion of my improved shock absorbing mechanism, corresponding substantially to the line 4—4 of Figure 1. And Figure 5 is a detail perspective view of a liner employed in connection with my improved mechanism.

In said drawings, 10—10 indicate channel shaped center or draft sills of a railway car underframe, to the inner sides of which are secured front stop lugs 11—11 and rear stop lugs 12—12. The inner end portion of the coupler shank is designated by 13, to which is connected the usual yoke member 14. My improved friction shock absorbing mechanism and a front main follower 15 are disposed within the yoke, the yoke and parts therewithin being supported by the usual detachable saddle plate 16 secured to the bottom flanges of the draft sills by bolts, as shown.

My improved shock absorbing mechanism, proper, comprises, broadly, a spring cage A; a friction shell B, which is connected thereto for relative movement; a main spring follower C; a main spring resistance D; a pair of liners E—E, which also serve as the means to anchor the friction shell to the cage; two friction wedge shoes F and G; a wedge block H; and a retainer bolt J.

The spring cage A is in the form of a substantially rectangular box-like member, having longitudinally extending, spaced side walls 17—17; horizontally disposed spaced top and bottom walls 18—18; and a transverse rear end wall 19. The end wall 19 cooperates with the stop lugs 12 in the manner of the usual rear follower. As most clearly shown in Figures 3 and 4, the side walls 17 extend forwardly of the top and bottom walls, thereby providing top and bottom openings 20 in the spring cage, for a purpose hereinafter pointed out. At the forward end portions, the side walls 17 are inwardly offset, as indicated at 21—21, thereby presenting transverse vertical front limiting wall sections 22—22 which cooperate with the anchoring means for the friction shell B, as hereinafter more fully described.

The side walls of the cage are also provided with longitudinally extending ribs 23—23 on the inner sides thereof, which cooperate with the spring follower to guide the same in its longitudinal movement. The ribs 23 are notched at the front ends, as indicated at 24, to facilitate assembling of the spring follower in the cage. The friction shell B is of substantially rectangular outline in cross section and, as shown, is telescoped within the front end portion of the spring cage A, being disposed between the inwardly offset wall sections 21—21 thereof. The friction shell B is provided with spaced side walls 25—25 and top and bottom walls 26—26. At its opposite sides, the shell B is provided with top and bottom longitudinally extending guide ribs 27—27, which engage within guide grooves 28—28, provided at the top and bottom portions of the side wall sections 21 of the cage A.

As will be evident, the friction shell B is thus limited to movement longitudinally of the mechanism by the guide ribs 27 which prevent vertical displacement of the friction shell with respect to the spring cage and by the side walls of the friction shell which engage between the wall sections 21 of the spring cage. Inward movement of the friction shell with respect to the spring cage is limited by the rear end of the shell coming into engagement with the inner end walls of the openings 20 provided in the top and bottom walls of the cage A. The side walls 25 of the friction shell are provided with seats 29—29 which are adapted to receive holding means on the liners E to prevent longitudinal movement of the liners with respect to the shell. The spring follower C which is disposed within the spring cage, is in the form of a relatively heavy substantially rectangular plate cut away at opposite sides, as shown in Figure 3, to prevent curved end faces. The opposite sides of the spring follower C are provided with notches 30—30, within which the ribs 23 of the spring cage engage, thereby guiding the spring follower for longitudinal movement.

The spring resistance D comprises a central spring element composed of an inner coil 31 and a heavier outer coil 32, and four additional spring elements disposed about the central element, each additional spring element also comprising a relatively light inner coil and a heavier outer coil. The four outer spring elements are disposed in the corners of the spring cage and have their opposite ends bearing respectively on the end wall 19 of the cage and the inner side of the spring follower C. The outer coil of the central spring member also has its opposite ends bearing on the end wall 19 and the spring follower C. The inner coil of the central spring extends through the spring follower C, the latter being provided with a central opening 33 for this purpose. The rear end of this spring bears on a hollow boss 34 extending forwardly from the end wall 19 of the spring cage.

The opening 33 in the spring follower is of such a size as to freely accommodate the front end of the coil 31 of the spring resistance so that the follower will have free inward movement with respect to this coil. The liners E are disposed at opposite sides of the friction shell B, each liner being provided with a central lateral enlargement 35 on the outer side thereof engaging within the corresponding seat 29 of the shell. The enlargement 35 substantially fits this seat so that the liner will be detachably fixed to the wall of the friction shell. On the inner side, each liner is provided with a longitudinally disposed friction surface 36 of substantially V-shape as shown most clearly in Figures 3 and 5. The two opposed friction surfaces 36 of the liners are preferably converged inwardly of the mechanism, as shown in Figure 1, to provide for a differential action. At the inner end, each liner is provided with a laterally outwardly projecting flange 38 which engages between the inner end of the friction shell B and the spring follower C. The flanges 38 of the liners are of such a length that they protrude beyond the sides of the friction shell and engage with the wall sections 22 of the spring cage to positively limit outward movement of the friction shell.

The friction shoes F and G are disposed at opposite sides of the friction shell and are of similar design except as hereinafter pointed out. Each shoe is provided with a longitudinally disposed V-shaped friction surface 39 cooperating with the friction surface 36 of the liner E at the same side of the friction shell. On the inner side, each shoe is provided with a lateral enlargement 40 having a wedge face on the front side thereof. The wedge face of the friction shoe F is indicated by 41 and that of the shoe G by 42. As shown, the wedge face 42 is disposed at a keen wedge-acting angle with respect to the longitudinal axis of the mechanism, while the wedge face 41 of the shoe F is disposed at a relatively blunt releasing angle with respect to said axis. Both wedge faces 41 and 42 are of V-shape section, as shown, to cooperate with similar wedge faces on the wedge block H.

The inner ends of the friction shoes F and G bear directly on the spring follower C, the spring follower being provided with forwardly projecting flange portions 43 which engage the inner ends of the friction shoes, while the main body portion of the spring follower bears on the flanged inner ends of the liners. As most clearly shown in Figure 3, the friction shoes are provided with top and bottom inwardly projecting flanges 44 at the inner ends thereof, which are provided with reinforcing webs 45. The webs 45 are cut away, as shown, so as to clear the central coil 31 of the spring resistance. At the top and bottom, the spring follower C is provided with lugs 46—46 which engage between the inner ends of the friction shoes and serve to center the parts during assembling of the mechanism. The front end portion of the coil 31 cooperates with the enlargements of the friction shoes, a spring follower disc 47 being interposed between the front end of this coil and the enlargements on the shoes.

The wedge block H is provided with a slightly curved front end face which bears directly on the inner side of the main follower 15. At the inner end, the wedge block is provided with a pair of V-shaped wedge faces 48 and 49 on the opposite sides thereof, the wedge face 48 being inclined at a relatively blunt wedge-acting angle to properly cooperate with the wedge face 41 of the friction shoe F, while the wedge face 49 is disposed at a relatively keen wedge-acting angle to cooperate with the wedge face 42 of the friction shoe G.

The mechanism is held assembled and of over-all uniform length by the retainer bolt J which has the head thereof disposed within the hollow boss 34 at the inner end of the spring cage and has the nut at the opposite end disposed within an opening provided in the wedge block H, the shank of the bolt extending through the coil spring 31 and an opening in the spring follower disc 47. In addition to serving to hold the mechanism assembled, the retainer bolt J is also employed to maintain the uniform over-all length of the mechanism and is so adjusted as to hold the spring 31 under the customary initial compression. As will be evident, due to the spring 31 being under compression, the friction shoes will be at all times maintained in engagement with the wedge block H, thereby compensating for wear of the friction and wedge faces of the mechanism. It is further pointed out that, due to the spring 31 being under compression, the friction shoes are yieldingly urged laterally outwardly by engagement with the wedge block and hold the liners seated against the side walls of the friction shell, thereby maintaining the enlargements 35 in anchored relation to the seats 29.

In assembly my improved shock absorbing mechanism, the four outer members of the main spring resistance, together with the coil 32, are first inserted within the spring cage through the open front end thereof. The spring follower is then inserted lengthwise, laterally, through the opening 20 of either the top or bottom wall of the cage, the spring at this time being placed under a slight compression so as to permit the free insertion of the follower. The spring follower is then rotated to transverse position, alining the notches 30 with the ribs 23. After the follower has been thus assembled, the friction shell B is inserted between the side wall sections 21 of the cage and the liners are assembled with the friction shell, engaging the enlargements 35 thereof within the seats 29 and the flanges 38 in back of the shell, disposing the same between the inner end of the shell and the follower C. At the same time, the outer ends of the flanges 38 will be engaged in back of the limiting wall sections 22 of the cage. As will be evident, when the parts have been thus far assembled, the spring follower C will be forced inwardly of the cage a sufficient distance to engage the notches 30 with the ribs 23, so that the spring follower will be locked within the cage. The inner coil 31 of the spring resistance is next placed in position by inserting the same through the opening 33 of the spring follower and the friction shoes, wedge block and spring follower disc are then placed in position and the parts secured by the retainer bolt J.

The operation of my improved shock absorbing mechanism, assuming a compression stroke, is as follows: The wedge block H will be forced inwardly of the spring cage A upon relative movement of the front follower 15 and the spring cage, and a wedging action will be set up between the wedge block and the friction shoes, thereby forcing the latter apart into tight frictional engagement with the friction surfaces of the liners which are anchored to the friction shell. Inward movement of the friction shoes will be resisted by the coil 31 of the main spring engaging the follower disc 47 and by the remaining members of the main spring resistance which engage the main spring follower C bearing on the inner ends of the shoes. Due to the great amount of friction created between the friction shoes and the friction surfaces of the shell, the shell will be forced inwardly in unison with the wedge block and friction shoes during the first part of the compression stroke of the mechanism and compression of all of the coils of the main spring resistance will be effected.

Inward movement of the friction shell will continue until the transverse end walls of the openings 20 in the top and bottom walls of the spring cage are engaged by the inner end of the friction shell, whereupon movement of the shell will be positively arrested, thereby compelling relative movement of the friction system comprising the wedge block and friction shoes, with respect to the friction shell, during the remainder of the compression stroke. During the relative movement of the friction shoes and friction shell, all of the members of the spring resistance will be compressed.

The compression of the mechanism will continue until the actuating force is reduced, whereupon the expansive action of the main spring resistance will return all of the parts of the mechanism to the normal full release position shown in Figure 1. Outward movement of the friction shell B will be positively limited by engagement of the flanges 38 of the liners E with the wall sections 22 of the cage and outward movement of the wedge will be limited by the retainer bolt J, thus determining the normal full release position of the friction shoes which are urged outwardly by the coil 31 of the main spring resistance after movement of the shell has been arrested.

From the preceding description, taken in connection with the drawings, it will be evident that I have provided exceedingly simple and efficient means for anchoring the friction shell of my improved shock absorbing mechanism to the spring cage, the detachable liners being employed for this purpose and being held engaged and interlocked with the friction shell by the spreading action of the spring urged friction wedge system. In addition to holding the parts assembled, the retaining means, comprising the flanges 38 of the liners, also serves to interlock the spring follower with the spring cage so as to prevent removal or accidental loss of the same by displacing the spring follower inwardly of the openings through which the same is inserted within the spring cage and maintaining the same in that condition.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a spring cage having top, bottom and side walls, said side walls being extended forwardly of the top and bottom walls; of a friction shell disposed between said side walls and having top and bottom guide ribs at opposite sides thereof, having shouldered engagement with the extended side walls of the cage to limit relative movement of the shell and cage to a direction lengthwise of the mechanism; means for anchoring the shell to the cage providing a lost motion connection therebetween; friction means cooperating with the shell including a wedge block and friction shoes; and spring resistance means within the cage opposing movement of the friction shell and friction means inwardly of the cage.

2. In a friction shock absorbing mechanism, the combination with a spring cage; of a friction shell telescoped within the front end of the cage, said shell and cage having limited relative movement; a spring follower disposed within the cage inwardly of the friction shell, certain walls of the cage being provided with openings through which the spring follower may be inserted; liners secured to the friction shell, said liners having flanges interposed between the friction shell and spring follower and having shouldered engagement with the cage, thereby limiting outward movement of the spring follower and maintaining the same in position inwardly of the openings in the shell to hold the same assembled with the cage; friction means cooperating with the liners; and a main spring resistance within the cage cooperating with the spring follower and opposing inward movement of the friction shell and friction shoes.

3. In a friction shock absorbing mechanism, the combination with a spring cage open at one end and having spaced side wall members at said open end inset from opposite sides of the cage, said inset wall members forming interior retaining shoulders at their inner ends; of a friction shell telescoped within the open end of the cage and being confined against lateral displacement and guided for movement lengthwise of the mechanism between said side walls; interengaging means on said side wall members and shell holding said shell against vertical displacement; abutment means on the cage cooperating with the inner end of the shell to limit longitudinal movement of the shell and cage with respect to each other to less than the full compression stroke of the mechanism; means for anchoring the shell to the cage, including interior liners detachably secured to opposed side walls of the shell, said liners having right angular, laterally outwardly projecting flanges at their rear ends overhanging the inner end of the shell and projecting laterally outward thereof and having shouldered engagement at their outer ends with the shoulders of the cage to limit outward movement of the liners and the shell; friction shoes having sliding frictional engagement with the liners; a wedge block having wedging engagement with the shoes; and spring resistance means within the cage yieldingly opposing inward movement of the shell and shoes.

In witness that I claim the foregoing I have hereunto subscribed my name this 8th day of September, 1928.

ALBERT P. WITHALL.